(12) United States Patent
Huang et al.

(10) Patent No.: US 8,184,199 B2
(45) Date of Patent: May 22, 2012

(54) IMAGE PROCESSING APPARATUS AND METHOD FOR PROCESSING INTERLACED VIDEO

(75) Inventors: Yi-Ming Huang, Banchiao (TW); Tung-Lin Hsieh, Jhongli (TW); Yu-Wen Huang, Sanchong (TW); Hsin-Hung Lee, Fongshan (TW); Chin-Kang Chang, Taoyuan (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 1168 days.

(21) Appl. No.: 12/007,528

(22) Filed: Jan. 11, 2008

(65) Prior Publication Data
US 2009/0052789 A1   Feb. 26, 2009

(30) Foreign Application Priority Data
Aug. 24, 2007   (TW) .............................. 96131332 A

(51) Int. Cl.
*H04N 7/01*   (2006.01)

(52) U.S. Cl. ........ 348/452; 348/448; 348/451; 348/620; 348/607; 348/701

(58) Field of Classification Search .................. 348/452, 348/448, 451, 620, 607, 701
See application file for complete search history.

(56) References Cited

U.S. PATENT DOCUMENTS
7,701,508 B2 *   4/2010  Wang et al. ................... 348/452
2009/0284650 A1 * 11/2009  Yu et al. ..................... 348/390.1
* cited by examiner

*Primary Examiner* — Joseph P Hirl
*Assistant Examiner* — Jivka Rabovianski
(74) *Attorney, Agent, or Firm* — Thomas|Kayden

(57) ABSTRACT

The invention provides an image processing apparatus for processing an interlaced video which includes a judging module, a determining module and a processing module. The judging module is used for judging if a pixel in the kth frame among P frames of the interlaced video relates to a moving object. If the result judged by the determining module is YES, the determining module determines one between two pixels adjacent to the judged pixel in the frame as an edge pixel relative to an edge of the moving object. The first processing module is used for calculating a gray scale of the edge pixel determined by the determining module in an average way.

16 Claims, 5 Drawing Sheets

| P(i-2, 2j-1) | P(i-1, 2j-1) | P(i, 2j-1) | P(i+1, 2j-1) | P(i+2, 2j-1) |
|---|---|---|---|---|
| P(i-2, 2j) | P(i-1, 2j) | P(i, 2j) | P(i+1, 2j) | P(i+2, 2j) |
| P(i-2, 2j+1) | P(i-1, 2j+1) | P(i, 2j+1) | P(i+1, 2j+1) | P(i+2, 2j+1) |

N (rows), M (columns)

FIG. 2

IMAGE PROCESSING APPARATUS AND METHOD FOR PROCESSING INTERLACED VIDEO

BACKGROUND OF THE INVENTION

1. Field of the Invention

The invention relates to an image processing apparatus and, more particularly, to an image processing apparatus for processing an interlaced video.

2. Description of the Prior Art

Presently, contents in ATSC television system or in certain DVDs often adopt interlaced video for saving the bandwidth. To transform the interlaced video into the progressive video, deinterlaced ways, such as a field insertion way, a duplicate way, an Edge-based Line Average (ELA) way, a 3D-ELA way, or an average way, are generally used.

However, if an image comprises rapidly moving objects, image defects such as sawtooth edges or ghosts will appear in the video processed in the deinterlaced way, and then the image quality decreases.

Therefore, the main scope of the invention is to provide an image processing apparatus and method for processing an interlaced video to solve the above-mentioned problems.

SUMMARY OF THE INVENTION

A scope of the invention is to provide an image processing apparatus and method for processing an interlaced video. The image processing apparatus and method determine an edge pixel relative to an edge of a moving object, and calculate the gray scale of the edge pixel in an average way. Accordingly, the sawtooth edges or other image defects generated during the image transformation can be decreased to further improve the image quality. Besides, different processing ways adopted according to judging if a respective pixel relates to the moving object, static object or slightly moving object not only can use the software and hardware of the image processing apparatus effectively but also can increase the processing speed.

According to an embodiment of the invention, the image processing apparatus for processing interlaced video comprises a first judging module, a determining module, and a first processing module. The interlaced video comprises P frames, and each of the P frames consists of N×M pixels. Each of the N×M pixels has a respective gray scale. P and M are both integers larger than or equal to 5, and N is an integer larger than or equal to 3.

The first judging module can judge if the pixel(i, 2j) in the kth frame among the P frames of the interlaced video relates to a moving object, wherein i is an integer index in a range from 3 to (M−2), j is an integer index in a range from 1 to (N−1)/2, and k is an integer index in a range from 3 to (P−2). The determining module is coupled to the first judging module and determines one between the pixel(i−1, 2j) and the pixel(i+1, 2j) in the kth frame as an edge pixel relative to an edge of the moving object if the result judged by the first judging module is YES. The first processing module is coupled to the determining module and can calculate the gray scale of each of the edge pixels determined by the determining module in an average way.

According to an image processing method for processing an interlaced video in an embodiment of the invention, the interlaced video comprises P frames, and each of the P frames consists of N×M pixels. Each of the N×M pixels has a respective gray scale. P and M are both integers larger than or equal to 5, and N is an integer larger than or equal to 3.

The method firstly judges if the pixel(i, 2j) in the kth frame among the P frames of the interlaced video relates to a moving object, wherein i is an integer index in a range from 3 to (M−2), j is an integer index in a range from 1 to (N−1)/2, and k is an integer index in a range from 3 to (P−2).

Afterward, if the pixel(i, 2j) is judged to be relative to the moving object, the method determines one between the pixel (i−1, 2j) and the pixel(i+1, 2j) in the kth frame as an edge pixel relative to an edge of the moving object.

Finally, the method calculates the gray scale of each of the determined edge pixels in an average way.

Therefore, according to the invention, the image processing apparatus and method for processing an interlaced video determine an edge pixel relative to an edge of a moving object, and calculate the gray scale of the edge pixel in an average way. Accordingly, the sawtooth edges or other image defects generated during the image transformation can be decreased to further improve the image quality. Besides, different processing ways adopted according to judging if a respective pixel relates to the moving object, static object or slightly moving object can use the software and hardware of the image processing apparatus effectively and increase the processing speed.

The advantage and spirit of the invention may be understood by the following recitations together with the appended drawings.

BRIEF DESCRIPTION OF THE APPENDED DRAWINGS

FIG. 2 is an example illustrating a frame comprised in the interlaced video.

DETAILED DESCRIPTION OF THE INVENTION

The invention is to provide an image processing apparatus and method for processing an interlaced video. The image processing apparatus and method determine an edge pixel relative to an edge of a moving object, and calculate the gray scale of the edge pixel in an average way. Accordingly, the sawtooth edges or other image defects generated during the image transformation can be decreased to further improve the image quality. Besides, different processing ways adopted according to judging if a respective pixel relates to the moving object, static object or slightly moving object can use the software and hardware of the image processing apparatus effectively and increase the processing speed. The spirit and feature of the invention will be described in detail by the following embodiments.

Figure 1:
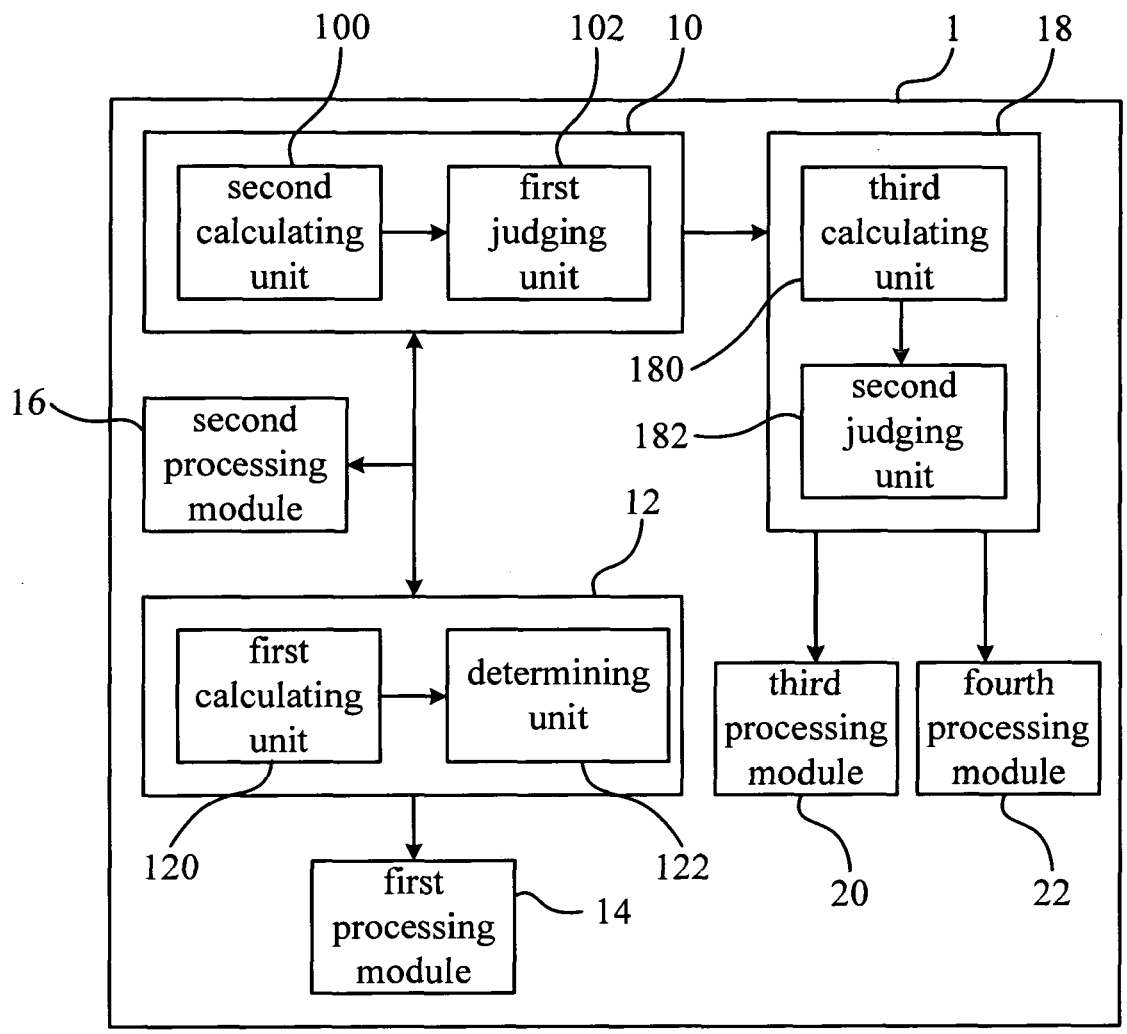
FIG. 1 is a function block diagram illustrating an image processing apparatus for processing an interlaced video according to an embodiment of the invention.

Please refer to FIG. 1. FIG. 1 is a function block diagram illustrating an image processing apparatus 1 for processing an interlaced video according to an embodiment of the invention. In this embodiment, the image processing apparatus 1 can be used to process an interlaced video. As shown in FIG. 1, the image processing apparatus 1 comprises a first judging module 10, a determining module 12, and a first processing module 14.

Please refer to FIG. 2. FIG. 2 is an example illustrating a frame comprised in the interlaced video. The interlaced video comprises P frames, wherein P is an integer larger than or equal to 5. As shown in FIG. 2, each of the P frames consists of N×M pixels, and each of the N×M pixels has a respective gray scale, wherein M is an integer larger than or equal to 5 and N is an integer larger than or equal to 3. In this embodiment, M equals to, but not limited to 5, and N equals to, but not limited to 3.

In this embodiment, the first judging module 10 can judge if the pixel P(i, 2j) in the kth frame among the P frames of the interlaced video relates to a moving object, wherein i is an integer index in a range from 3 to (M−2), j is an integer index in a range from 1 to (N−1)/2, and k is an integer index in a range from 3 to (P−2).

The determining module 12 is coupled to the first judging module 10, and determines one between the pixel P(i−1, 2j) and the pixel P(i+1, 2j) in the kth frame as an edge pixel relative to an edge of the moving object if the result judged by the first judging module 10 is YES.

The first processing module 14 is coupled to the determining module 12, and calculates the gray scale of each of the edge pixels determined by the determining module 12 in an average way.

According to calculating the gray scales of the edge pixels, the edges of the moving object in the image can be smoother and clearer, so as to further improve the image quality.

In practice, the determining module 12 can comprise a first calculating unit 120 and a determining unit 122. The first calculating unit 120 can be used for calculating a first absolute difference between the gray scales of the pixel P(i, 2j−1) and the pixel P(i−2, 2j+1) in the kth frame, and for calculating a second absolute difference between the gray scales of the pixel P(i, 2j−1) and the pixel P(i+2, 2j+1) in the kth frame. The determining unit 122 is coupled to the first calculating unit 120. The determining unit 122 can be used for determining one between the pixel P(i−1, 2j) and the pixel P(i+1, 2j) in the kth frame as the edge pixel according to the first absolute difference and the second absolute difference. In practice, if the first absolute difference is smaller than the second absolute difference, the determining unit 122 determines the pixel P(i−1, 2j) as the edge pixel. On the other hand, if the first absolute difference is larger than the second absolute difference, the determining unit 122 determines the pixel P(i+1, 2j) as the edge pixel.

In practice, if the pixel P(i−1, 2j) in the kth frame is determined as the edge pixel, the average way calculates the gray scale of the edge pixel by averaging the gray scales of the pixel P(i, 2j−1) and the pixel P(i−2, 2j+1) in the kth frame. Else if the pixel P(i+1, 2j) in the kth frame is determined as the edge pixel, the average way calculates the gray scale of the edge pixel by averaging the gray scales of the pixel P(i, 2j−1) and the pixel P(i+2, 2j+1) in the kth frame.

In practice, the image processing apparatus 1 can further comprise a second processing module 16 coupled to the first judging module 10, as shown in FIG. 1. The second processing module 16 can calculate the gray scale of the pixel P(i, 2j) in the kth frame in an Edge-based Line Average (ELA) way if the result judged by the first judging module 10 is YES. The ELA way can be easily achieved by one who knows the technique field well, and it will not be described here.

In practice, the first judging module 10 can comprise a second calculating unit 100 and a first judging unit 102. The second calculating unit 100 can calculate a difference sum according to the following formula:

$$Diff1 = \left| \frac{\sum_{x=-R}^{R} G[(i+x), (2j-1), (k-2)]}{2R+1} - \frac{\sum_{x=-R}^{R} G[(i+x), (2j-1), k]}{2R+1} \right|$$

$$Diff2 = \left| \frac{\sum_{x=-R}^{R} G[(i+x), (2j-1), (k)]}{2R+1} - \frac{\sum_{x=-R}^{R} G[(i+x,), (2j-1), (k+2)]}{2R+1} \right|$$

$$Diff3 = \left| \frac{\sum_{x=-R}^{R} G[(i+x), (2j), (k-1)]}{2R+1} - \frac{\sum_{x=-R}^{R} G[(i+x), (2j), (k+1)]}{2R+1} \right|$$

$$DS = Diff1 + Diff2 + Diff3$$

wherein G(a, b, c) is the gray scale of the pixel(a, b) in the cth frame, DS is the difference sum, and R is an integer in the range from 1 to (M−1)/2.

The first judging unit 102 is coupled to the second calculating unit 100. The first judging unit 102 can judge if the pixel P(i, 2j) in the kth frame relates to the moving object according to the difference sum and a threshold. In practice, if the difference sum is larger than the threshold, the result judged by the first judging unit 102 is YES. On the other hand, if the difference sum is smaller than the threshold, the result judged by the first judging unit 102 is NO.

It should be noticed that the first judging module 10 calculates the difference sum according to five frames from beginning to end to increase the accuracy for judging if the pixel P(i, 2j) in the kth frame relates to the moving object. Furthermore, in practice, the image processing apparatus 1 can further execute the open calculation for the kth frame firstly, and then execute the close calculation so as to remove certain pixels which are mistaken to be relative to the moving object, and to further increase the accuracy of judgment.

As shown in FIG. 1, in practice, the image processing apparatus 1 can further comprise a second judging module 18 coupled to the first judging module 10. The judging module 18 can comprise a third calculating unit 180 and a second judging unit 182 coupled to the third calculating unit 180.

The third calculating unit 180 can calculate a gray scale difference between the gray scales of the pixel P(i, 2j) in the (k−1)th frame and the pixel P(i, 2j) in the (k+1)th frame if the result judged by the first judging module 180 is NO. Afterward, the second judging unit 182 can judge if the pixel P(i, 2j) in the kth frame relates to a static object or a slightly moving object based on the gray scale difference. In practice, if the gray scale difference is equal to zero, the pixel P(i, 2j) in the kth frame is judged as being relative to the static object; otherwise, the pixel P(i, 2j) in the kth frame is judged as being relative to the slightly moving object. In other words, the second judging module 18 judges if the pixel P(i, 2j) in the kth frame relates to the static object or the slightly moving object according to calculating gray scale difference between the gray scales of the pixels, corresponding to the pixel P(i, 2j) in kth frame, in the (k−1)th frame and in the (k+1)th frame when the first judging module 10 judges that the pixel P(i, 2j) in the kth frame is not relative to the moving object.

In practice, the image processing apparatus 1 can further comprise a third processing module 20 coupled to the second judging module 18. The third processing module 20 can calculate the gray scale of the pixel P(i, 2j) in a field insertion way if the pixel P(i, 2j) in the kth frame is judged as being relative to the static object. The field insertion way can be easily achieved by one who knows the technique field well, and it will not be described here.

In practice, the image processing apparatus 1 can further comprise a fourth processing module 22 coupled to the second judging module 18. The fourth processing module 22 can calculate the gray scale of the pixel P(i, 2j) in a 3D-ELA way if the pixel P(i, 2j) in the kth frame is judged as being relative to the slightly object. The 3D-ELA way can be easily achieved by one who knows the technique field well, and it will not be described here.

Accordingly, the sawtooth edges or other image defects generated during the image transformation can be decreased to further improve the image quality.

Figure 3:
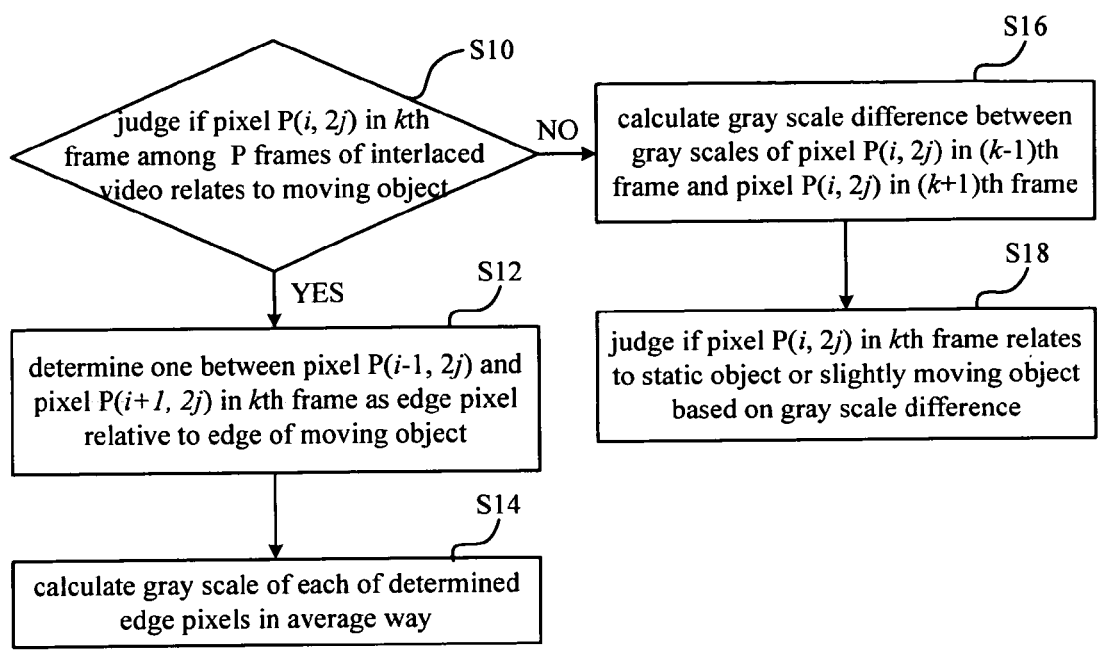
FIG. 3 is a flow chart illustrating an image processing method for processing an interlaced video according to another embodiment of the invention.

Please refer to FIG. 3 and FIG. 2 together. FIG. 3 is a flow chart illustrating an image processing method for processing an interlaced video according to another embodiment of the invention. In this embodiment, the image processing method is used for processing an interlaced video. The interlaced video comprises P frames, wherein P is an integer larger than or equal to 5. As shown in FIG. 2, each of the P frames consists of N×M pixels, and each of the N×M pixels has a respective gray scale, wherein M is an integer larger than or equal to 5 and N is an integer larger than or equal to 3. In this embodiment, M equals to, but not limited to 5, and N equals to, but not limited to 3.

As shown in FIG. 3, firstly, the image processing method executes step S10 to judge if the pixel P(i, 2j) in the kth frame among the P frames of the interlaced video relates to a moving object, wherein i is an integer index in a range from 3 to (M−2), j is an integer index in a range from 1 to (N−1)/2, and k is an integer index in a range from 3 to (P−2).

Afterward, the image processing method executes step S12 to determine one between the pixel P(i−1, 2j) and the pixel P(i+1, 2j) in the kth frame as an edge pixel relative to an edge of the moving object if YES in step S10, and then the image processing method executes step S14.

Finally, the image processing method executes step S14 to calculate the gray scale of each of the determined edge pixels in an average way.

According to calculating the gray scales of the edge pixels, the edges of the moving object in the image can be smoother and clearer, so as to further improve the image quality.

Figure 4:
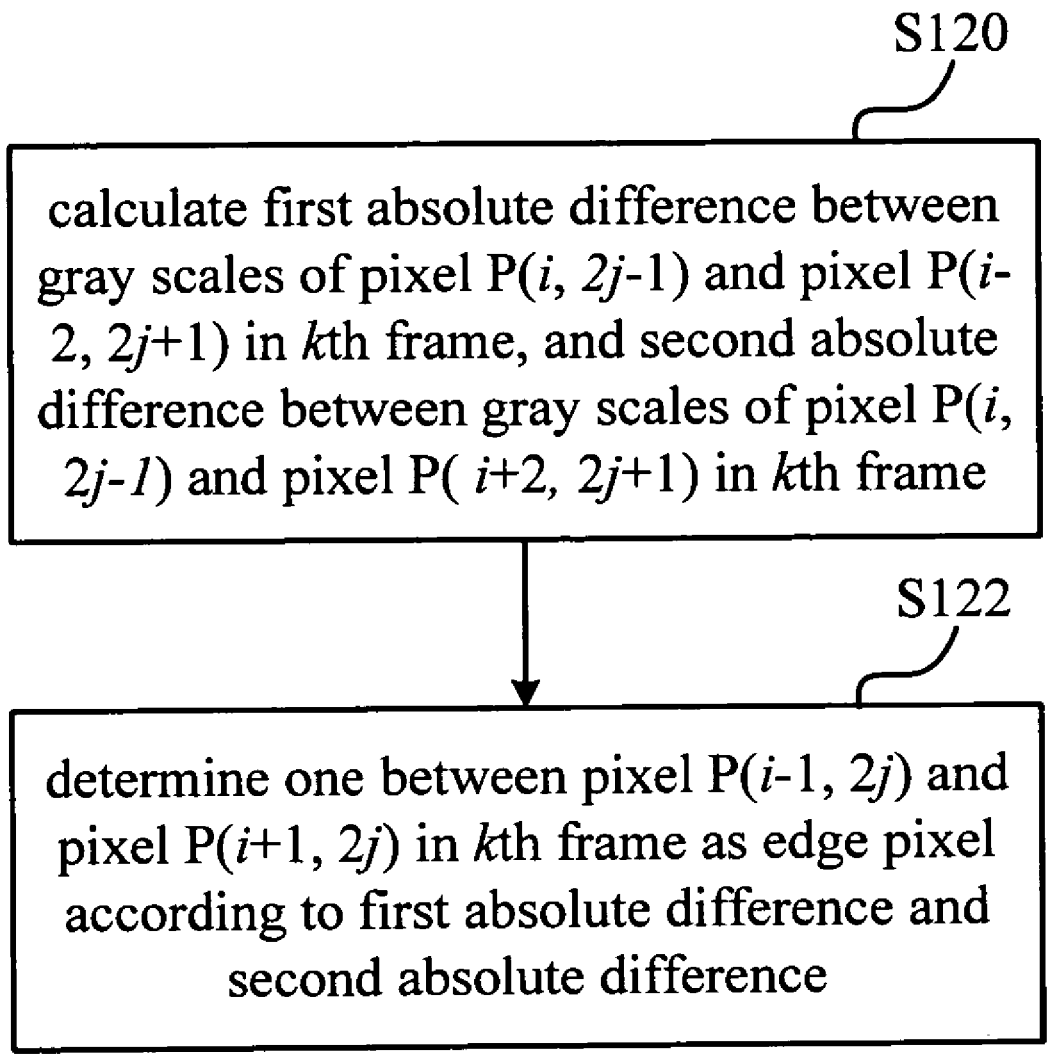
FIG. 4 is a flow chart illustrating step S12 in FIG. 3 in detail.

Please refer to FIG. 4. FIG. 4 is a flow chart illustrating step S12 in FIG. 3 in detail. In practice, step S12 can be performed by the following steps. As shown in FIG. 4, firstly, the image processing method executes step S120 to calculate a first absolute difference between the gray scales of the pixel P(i, 2j−1) and the pixel P(i−2, 2j+1) in the kth frame, and a second absolute difference between the gray scales of the pixel P(i, 2j−1) and the pixel P(i+2, 2j+1) in the kth frame. Afterward, the image processing method executes step S122 to determine one between the pixel P(i−1, 2j) and the pixel P(i+1, 2j) in the kth frame as the edge pixel according to the first absolute difference and the second absolute difference. In practice, if the first absolute difference is smaller than the second absolute difference, the pixel P(i−1, 2j) is determined as the edge pixel. On the other hand, if the first absolute difference is larger than the second absolute difference, the pixel P(i+1, 2j) is determined as the edge pixel.

In practice, in step S14, if the pixel P(i−1, 2j) in the kth frame is determined as the edge pixel, the average way calculates the gray scale of the edge pixel by averaging the gray scales of the pixel P(i, 2j−1) and the pixel P(i−2, 2j+1) in the kth frame. Else if the pixel P(i+1, 2j) in the kth frame is determined as the edge pixel, the average way calculates the gray scale of the edge pixel by averaging the gray scales of the pixel P(i, 2j−1) and the pixel P(i+2, 2j+1) in the kth frame.

In practice, the image processing method can further comprise a step for calculating the gray scale of the pixel P(i, 2j) in the kth frame in an Edge-based Line Average (ELA) way if the result in step S10 is YES. The ELA way can be easily achieved by one who knows the technique field well, and it will not be described here.

Figure 5:
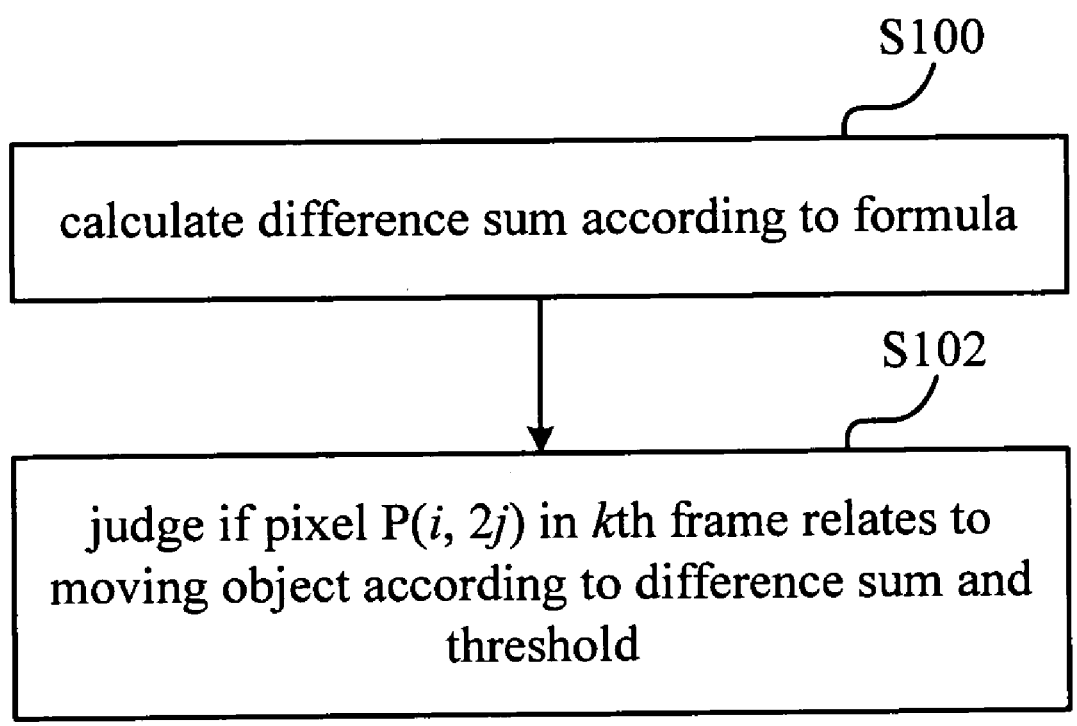
FIG. 5 is a flow chart illustrating step S10 in FIG. 3 in detail.

Please refer to FIG. 5. FIG. 5 is a flow chart illustrating step S10 in FIG. 3 in detail. As shown in FIG. 5, in practice, step S10 can be performed by the following step. As shown in FIG. 5, firstly, the image processing method executes step S100 to calculate a difference sum according to the following formula:

$$Diff1 = \left| \frac{\sum_{x=-R}^{R} G[(i+x), (2j-1), (k-2)]}{2R+1} - \frac{\sum_{x=-R}^{R} G[(i+x), (2j-1), k]}{2R+1} \right|$$

$$Diff2 = \left| \frac{\sum_{x=-R}^{R} G[(i+x), (2j-1), (k)]}{2R+1} - \frac{\sum_{x=-R}^{R} G[(i+x,), (2j-1), (k+2)]}{2R+1} \right|$$

$$Diff3 = \left| \frac{\sum_{x=-R}^{R} G[(i+x), (2j), (k-1)]}{2R+1} - \frac{\sum_{x=-R}^{R} G[(i+x), (2j), (k+1)]}{2R+1} \right|$$

$$DS = Diff1 + Diff2 + Diff3$$

wherein G(a, b, c) is the gray scale of the pixel(a, b) in the cth frame, DS is the difference sum, and R is an integer in the range from 1 to (M−1)/2.

Finally, the image processing method executes step S102 to judge if the pixel P(i, 2j) in the kth frame relates to the moving object according to the difference sum and a threshold. In practice, if the difference sum is larger than the threshold, the result is YES. On the other hand, if the difference sum is smaller than the threshold, the result is NO.

It should be noticed that, in step S10, the image processing method calculates the difference sum according to five frames from beginning to end to increase the accuracy for judging if the pixel P(i, 2j) in the kth frame relates to the moving object. Furthermore, in practice, the image processing method can further execute the open calculation for the kth frame firstly, and then execute the close calculation so as to remove certain pixels which are mistaken to be relative to the moving object and to further increase the accuracy of judgment.

In practice, the image processing method can further comprise the following steps. As shown in FIG. 3, the image processing method can execute step S16 to calculate a gray scale difference between the gray scales of the pixel P(i, 2j) in the (k−1)th frame and the pixel P(i, 2j) in the (k+1)th frame if the result in step S10 is NO, and then the image processing method executes step S18. Finally, the image processing method executes step S18 to judge if the pixel P(i, 2j) in the kth frame relates to a static object or a slightly moving object based on the gray scale difference. In practice, if the gray scale difference is equal to zero, the pixel P(i, 2j) in the kth frame is judged as being relative to the static object; otherwise, the pixel P(i, 2j) in the kth frame is judged as being relative to the slightly moving object. In other words, the image processing method can execute step S18 to judges if the pixel P(i, 2j) in the kth frame relates to the static object or the slightly moving object according to calculating gray scale difference between the gray scales of the pixels, corresponding to the pixel P(i, 2j) in kth frame, in the (k−1)th frame and in the (k+1)th frame when the image processing method executes step S10 to judge that the pixel P(i, 2j) in the kth frame is not relative to the moving object.

In practice, the image processing method can further comprise a step for calculating the gray scale of the pixel P(i, 2j) in a field insertion way if the pixel P(i, 2j) in the kth frame is judged as being relative to the static object. The field insertion way can be easily achieved by one who knows the technique field well, and it will not be described here.

In practice, the image processing method can further comprise a step for calculating the gray scale of the pixel P(i, 2j) in a 3D-ELA way if the pixel P(i, 2j) in the kth frame is judged as being relative to the slightly moving object. The 3D-ELA way can be easily achieved by one who knows the technique field well, and it will not be described here.

Compared to the prior art, the image processing apparatus and method for processing an interlaced video determine an edge pixel relative to an edge of a moving object according to the invention, and calculate the gray scale of the edge pixel in an average way. Accordingly, the sawtooth edges or other image defects generated during the image transformation can be decreased to further improve the image quality. Besides, different processing ways adopted according to judging if a respective pixel relates to the moving object, static object or slightly moving object can use the software and hardware of the image processing apparatus effectively and increase the processing speed.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing apparatus for processing an interlaced video comprising P frames, each of the P frames consisting of N×M pixels, each of the N×M pixels having a respective gray scale, P and M both being integers larger than or equal to 5, N being an integer larger than or equal to 3, the image processing apparatus comprising:

a first judging module tangibly embodied in a computing device, for judging if the pixel(i, 2j) in the kth frame among the P frames of the interlaced video relates to a moving object, i being an integer index in a range from 3 to (M−2), j being an integer index in a range from 1 to (N−1)/2, and k being an integer index in a range from 3 to (P−2), wherein the first judging module comprises:

a second calculating unit tangibly embodied in the computing device, for calculating a difference sum according to the following formula:

$$Diff1 = \left| \frac{\sum_{x=-R}^{R} G[(i+x), (2j-1), (k-2)]}{2R+1} - \frac{\sum_{x=-R}^{R} G[(i+x), (2j-1), k]}{2R+1} \right|$$

$$Diff2 = \left| \frac{\sum_{x=-R}^{R} G[(i+x), (2j-1), (k)]}{2R+1} - \frac{\sum_{x=-R}^{R} G[(i+x,), (2j-1), (k+2)]}{2R+1} \right|$$

$$Diff3 = \left| \frac{\sum_{x=-R}^{R} G[(i+x), (2j), (k-1)]}{2R+1} - \frac{\sum_{x=-R}^{R} G[(i+x), (2j), (k+1)]}{2R+1} \right|$$

$$DS = Diff1 + Diff2 + Diff3$$

wherein G(a, b, c) is the gray scale of the pixel(a, b) in the cth frame, and DS is the difference sum, R is an integer in the range from 1 to (M−1)/2; and a first judging unit tangibly embodied in the computing device and coupled to the second calculating unit, for judging if the pixel(i, 2j) in the kth frame relates to the moving object according to the difference sum and a threshold;

a determining module tangibly embodied in the computing device and coupled to the first judging module, for determining one between the pixel(i−1, 2j) and the pixel(i+1, 2j) in the kth frame as an edge pixel relative to an edge of the moving object if the result judged by the first judging module is YES; and a first processing module tangibly embodied in the computing device and coupled to the determining module, for calculating the gray scale of each of the edge pixels determined by the determining module in an average way.

2. The image processing apparatus of claim 1, wherein the determining module comprises:

a first calculating unit tangibly embodied in the computing device, for calculating a first absolute difference between the gray scales of the pixel(i,2j−1) and the pixel(i−2, 2j+1) in the kth frame, and for calculating a second absolute difference between the gray scales of the pixel(i, 2j−1) and the pixel(i+2, 2j+1) in the kth frame; and a determining unit tangibly embodied in the computing device and coupled to the first calculating unit, for determining one between the pixel(i−1, 2j) and the pixel(i+1, 2j) in the kth frame as the edge pixel according to the first absolute difference and the second absolute difference.

3. The image processing apparatus of claim 2, wherein the average way is performed by the following steps:

if the pixel(i−1, 2j) in the kth frame is determined as the edge pixel, calculating the gray scale of the edge pixel by averaging the gray scales of the pixel(i, 2j−1) and the pixel(i−2, 2j+1) in the kth frame; and else if the pixel(i+1, 2j) in the kth frame is determined as the edge pixel, calculating the gray scale of the edge pixel by averaging the gray scales of the pixel(i, 2j−1) and the pixel(i+2, 2j+1) in the kth frame.

4. The image processing apparatus of claim 1, further comprising a second processing module tangibly embodied in the computing device and coupled to the first judging module, for calculating the gray scale of the pixel(i, 2j) in the kth frame in an Edge-based Line Average (ELA) way if the result judged by the first judging module is YES.

5. The image processing apparatus of claim 1, further comprising a second judging module tangibly embodied in the computing device and coupled to the first judging module, the second judging module comprising:

a third calculating unit tangibly embodied in the computing device, for calculating a gray scale difference between the gray scales of the pixel(i, 2j) in the (k−1)th frame and the pixel(i, 2j) in the (k+1)th frame if the result judged by the first judging module is NO; and a second judging unit tangibly embodied in the computing device and coupled to the third calculating unit, for judging if the pixel(i, 2j) in the kth frame relates to a static object or a slightly moving object based on the gray scale difference.

6. The image processing apparatus of claim 5, wherein if the gray scale difference is equal to zero, the pixel(i, 2j) in the kth frame is judged as being relative to the static object, else the pixel(i, 2j) in the kth frame is judged as being relative to the slightly moving object.

7. The image processing apparatus of claim 5, further comprising a third processing module tangibly embodied in the computing device and coupled to the second judging module, for calculating the gray scale of the pixel(i, 2j) in a field insertion way if the pixel(i, 2j) in the kth frame is judged as being relative to the static object.

8. The image processing apparatus of claim 5, further comprising a forth processing module tangibly embodied in the computing device and coupled to the second judging module, for calculating the gray scale of the pixel(i, 2j) the kth frame in a 3D Edge-based Line Average (ELA) way if the pixel(i, 2j) in the kth frame is judged as being relative to the slightly moving object.

9. An image processing method for processing an interlaced video comprising P frames, each of P frames consisting of N×M pixels, each of the N×M pixels having a respective gray scale, P and M both being integers larger than or equal to 5, N being an integer larger than or equal to 3, the image processing method comprising the following steps:
   (a) judging if the pixel(i, 2j) in the kth frame among the P frames of the interlaced video relates to a moving object, i being an integer index in a range from 3 to (M−2), j being an integer index in a range from 1 to (N−1)/2, and k being an integer index in a range from 3 to (P−2), wherein step (a) comprises the following steps:
      (a1)) calculating a difference sum according to the following formula:

$$Diff1 = \left| \frac{\sum_{x=-R}^{R} G[(i+x),(2j-1),(k-2)]}{2R+1} - \frac{\sum_{x=-R}^{R} G[(i+x),(2j-1),k]}{2R+1} \right|$$

$$Diff2 = \left| \frac{\sum_{x=-R}^{R} G[(i+x),(2j-1),(k)]}{2R+1} - \frac{\sum_{x=-R}^{R} G[(i+x,),(2j-1),(k+2)]}{2R+1} \right|$$

$$Diff3 = \left| \frac{\sum_{x=-R}^{R} G[(i+x),(2j),(k-1)]}{2R+1} - \frac{\sum_{x=-R}^{R} G[(i+x),(2j),(k+1)]}{2R+1} \right|$$

$$DS = Diff1 + Diff2 + Diff3$$

wherein G(a, b, c) is the gray scale of the pixel(a, b) in the cth frame, and DS is the difference sum, R is an integer in the range from 1 to (M−1)/2; and
      (a2) judging if the pixel(i, 2j) in the kth frame relates to the moving object according to the difference sum and a threshold;
   (b) determining one between the pixel(i−1, 2j) and the pixel(i+1,2j) in the kth frame as an edge pixel relative to an edge of the moving object if YES in step (a); and
   (c) calculating the gray scale of each of the determined edge pixels in an average way.

10. The image processing method of claim 9, wherein step (b) comprises the following steps:
   (b1) calculating a first absolute difference between the gray scales of the pixel(i, 2−1) and the pixel(i−2, 2j+1) in the kth frame, and a second absolute difference between the gray scales of the pixel(i, 2j−1) and the pixel(i+2, 2j+1) in the kth frame; and
   (b2) determining one between the pixel(i−1, 2j) and the pixel(i+1, 2j) in the kth frame as the edge pixel according to the first absolute difference and the second absolute difference.

11. The image processing method of claim 10, wherein in step (c), the average way is performed by the following steps:
   if the pixel(i−1, 2j) in the kth frame is determined as the edge pixel, calculating the gray scale of the edge pixel by averaging the gray scales of the pixel(i, 2j−1) and the pixel(i−2, 2j+1) in the kth frame; and
   else if the pixel(i+1, 2j) in the kth frame is determined as the edge pixel, calculating the gray scale of the edge pixel by averaging the gray scales of the pixel(i, 2j−1) and the pixel(i+2, 2j+1) in the kth frame.

12. The image processing method of claim 9, further comprising the following step:
   calculating the gray scale of the pixel(i, 2j) in the kth frame in an Edge-based Line Average (ELA) way if YES in the step (a).

13. The image processing method of claim 9, further comprising the following steps:
   (d) calculating a gray scale difference between the gray scales of the pixel(i, 2j) in the (k−1)th frame and the pixel(i, 2j) in the (k+1)th frame if NO in step (a); and
   (e) judging if the pixel(i, 2j) in the kth frame relates to a static object or a slightly moving object based on the gray scale difference.

14. The image processing method of claim 13, wherein if the gray scale difference is equal to zero, the pixel(i, 2j) in the kth frame is judged as being relative to the static object, else the pixel(i, 2j) in the kth frame is judged as being relative to the slightly moving object.

15. The image processing method of claim 13, further comprising the following step:
   calculating the gray scale of the pixel(i, 2j) in a field insertion way if the pixel(i, 2j) in the kth frame is judged as being relative to the static object.

16. The image processing method of claim 13, further comprising the following step:
   calculating the gray scale of the pixel(i, 2j) the kth frame in a 3D Edge-based Line Average (ELA) way if the pixel(i, 2j) in the kth frame is judged as being relative to the slightly moving object.

\* \* \* \* \*